C. H. HOWARD.
PAPER REINFORCING MACHINE.
APPLICATION FILED JULY 25, 1918.

1,341,981.

Patented June 1, 1920.
10 SHEETS—SHEET 4.

Inventor:
Charles H. Howard
by Robt. F. Harris,
Attorney

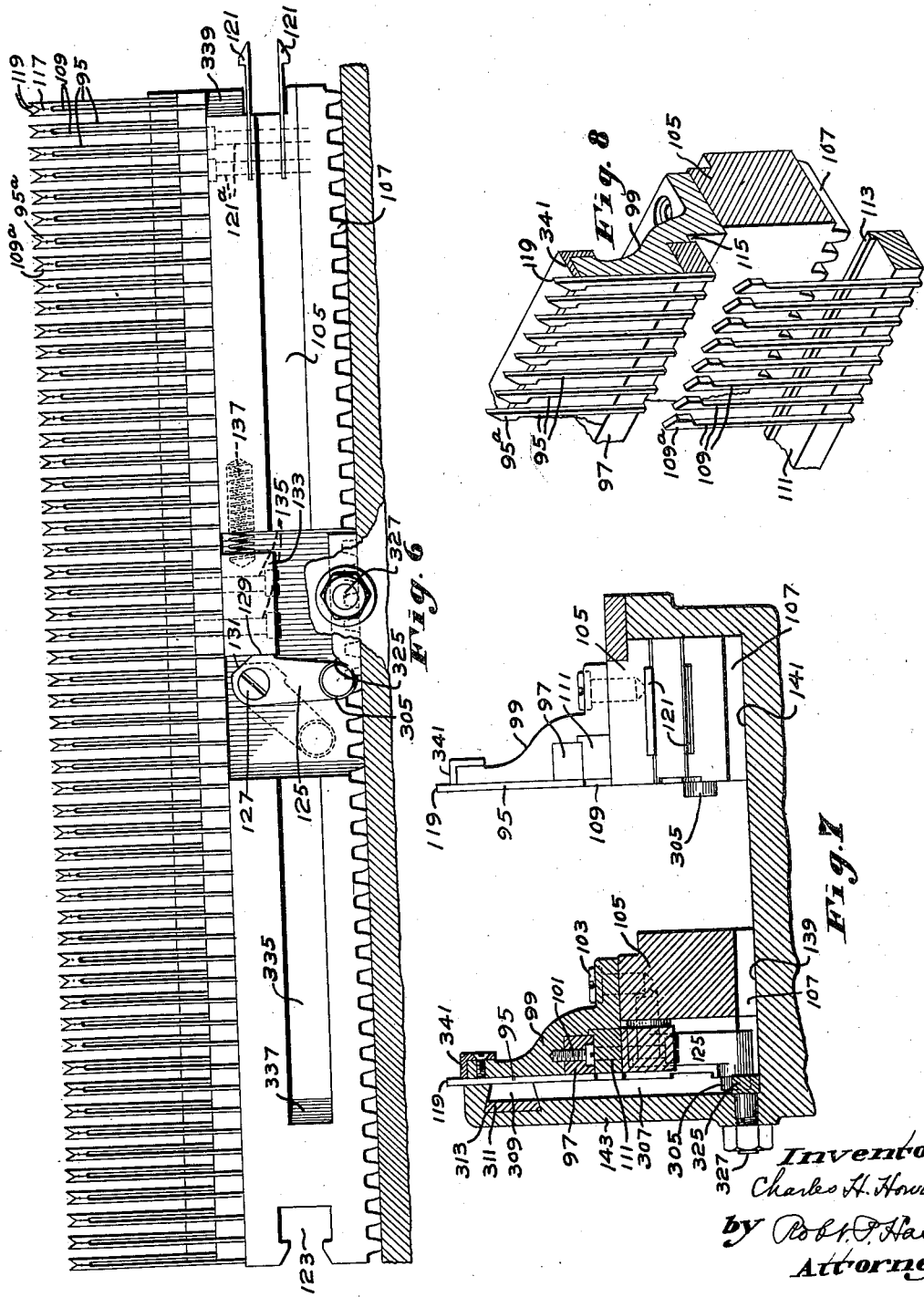

C. H. HOWARD.
PAPER REINFORCING MACHINE.
APPLICATION FILED JULY 25, 1918.

1,341,981.

Patented June 1, 1920.
10 SHEETS—SHEET 6.

Inventor:
Charles H. Howard
by Robt P. Harris
Attorney

C. H. HOWARD.
PAPER REINFORCING MACHINE.
APPLICATION FILED JULY 25, 1918.

1,341,981.

Patented June 1, 1920.
10 SHEETS—SHEET 7.

Inventor:
Charles H. Howard
by Robt. P. Hains.
Attorney

C. H. HOWARD.
PAPER REINFORCING MACHINE.
APPLICATION FILED JULY 25, 1918.

1,341,981.

Patented June 1, 1920.
10 SHEETS—SHEET 8.

Inventor:
Charles H. Howard
by Rob't P. Hains
Attorney

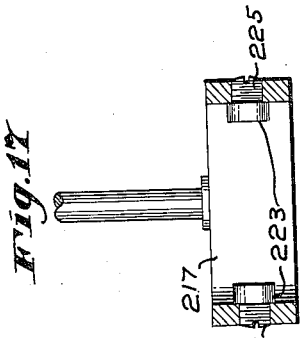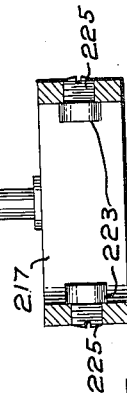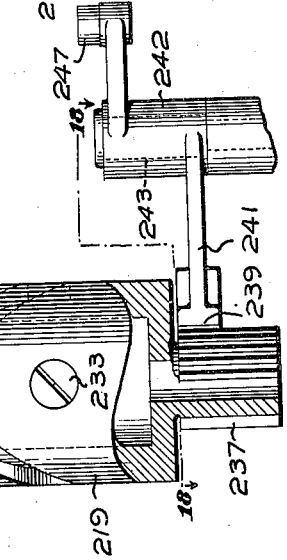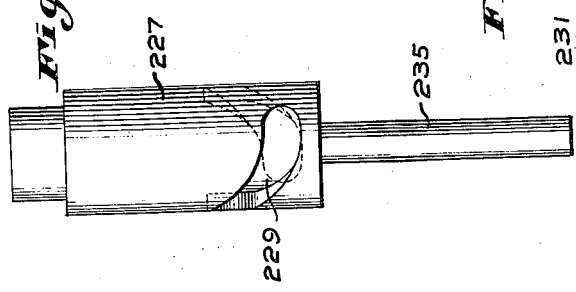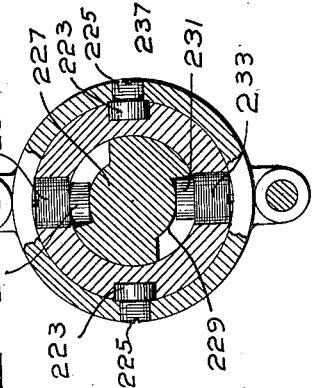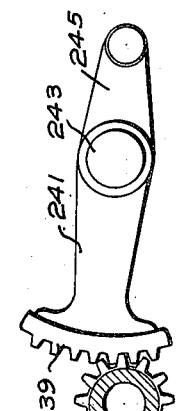

C. H. HOWARD.
PAPER REINFORCING MACHINE.
APPLICATION FILED JULY 25, 1918.
1,341,981.
Patented June 1, 1920.
10 SHEETS—SHEET 10.
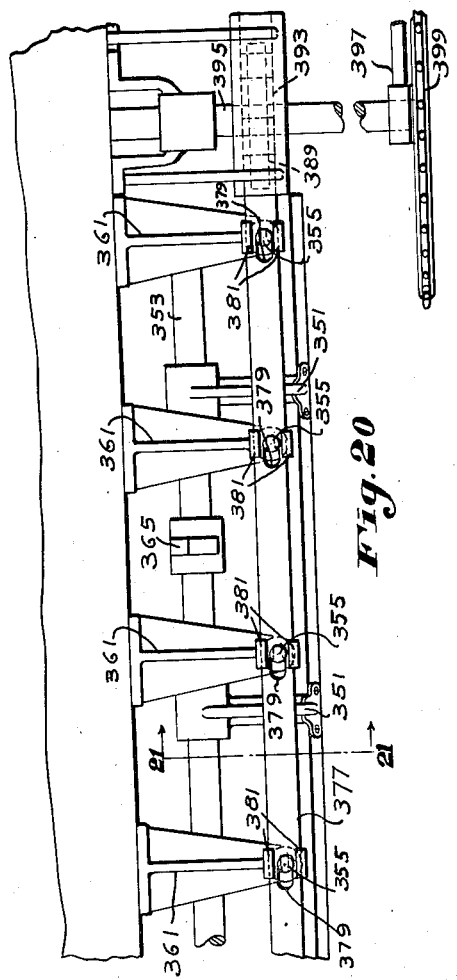
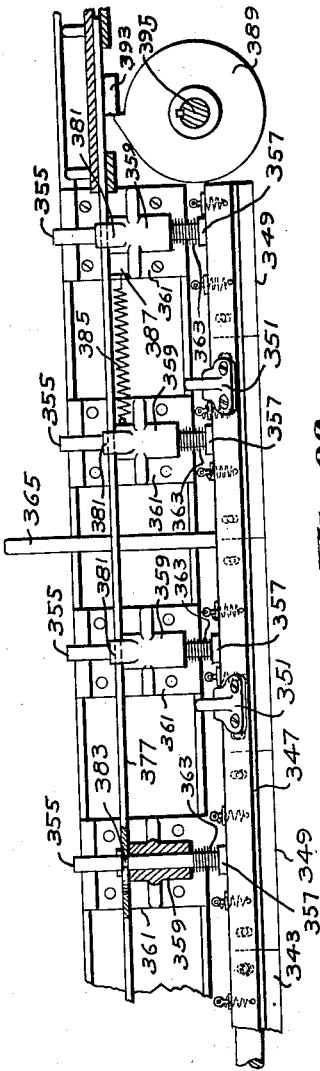
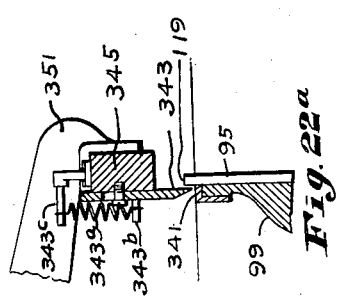

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

PAPER-REINFORCING MACHINE.

1,341,981.  Specification of Letters Patent.  Patented June 1, 1920.

Application filed July 25, 1918. Serial No. 246,644.

*To all whom it may concern:*

Be it known that I, CHARLES H. HOWARD, a citizen of the United States, residing at Saugus, in the county of Essex and State of Massachusetts, have invented an Improvement in Paper-Reinforcing Machines, of which the following description, in connection with the accompanying drawings, is a specification, like characters on the drawings representing like parts.

The invention to be hereinafter described relates to machines for reinforcing fabrics, and more particularly to such machines for reinforcing paper fabrics or paper stock by the application thereto of reinforcing filaments.

In this general type of machine, the transversely extending reinforcing filaments, which may be threads, cords, wires or similar elements, are drawn from a source of supply by drawing or distending means and placed in transverse position relative to the machine frame, or the paper, carrier or other receiver to which the filaments are to be transferred.

In my prior application, Serial No. 214,910, filed February 1, 1918, is shown, described and claimed carrier means for transferring the filaments distended by the drawing or distending means to the paper or other receiver. The construction is such that the carrier means is elevated to the plane of the distending filaments, takes the filaments from the drawing or distending means, lowers to the plane of the receiver, and is then caused to advance with the receiver in unison therewith to apply the filaments thereto. The filaments are then released by the carrier means, and the latter returns to a position in readiness to be elevated to take another group of filaments from the drawing or distending means. This has been found to be a good, efficient mechanism for the purpose, but the delay occasioned by the return movement of the carrier means to the distending means limits the output of this machine. However, for efficient operation it is desirable that the drawing or distending means and the carrier means should be held against relative movement while the carrier means is taking the filaments from the gripper means in order that the filaments may be retained in uniform, distended relation.

One of the objects, therefore, of the present invention, is the provision of a mechanism whereby the carrier means may intermittently take the filaments from the drawing or distending means without relative movement between them, but may continuously apply filaments to the receiver. As a consequence, the capacity of the machine is desirably increased. In carrying this feature of the invention into practical effect, the carrier means may be in the form of trains of links or members at the sides of the machine, the members of each of said trains being provided with fingers or equivalent elements for taking and releasing the filaments at the times required. The members of a train may be detachably connected or coupled together, so that while the train is continuously driven, the leading links or members of the train may be progressively transferred to the rear of the train. Here they may be raised and lowered to take the filaments from the drawing or distending means, and then they may be caused to overtake and couple with the continuously moving train.

In my prior application, Serial No. 139,475, filed December 29, 1916, is shown, described and claimed hammer actuated cutter means for severing the filaments from their source of supply after they have been taken from the drawing or distending means by the carrier means. Another object of the present invention is the provision of automatic means for operating the hammer actuated cutter means to sever the distended filaments from their source of supply at the proper time.

With the aforesaid and other objects in view, the character of the invention may be best understood by reference to the following description of one good form of means for carrying the invention into practical effect, shown in the accompanying drawings, wherein:—

Figure 2:
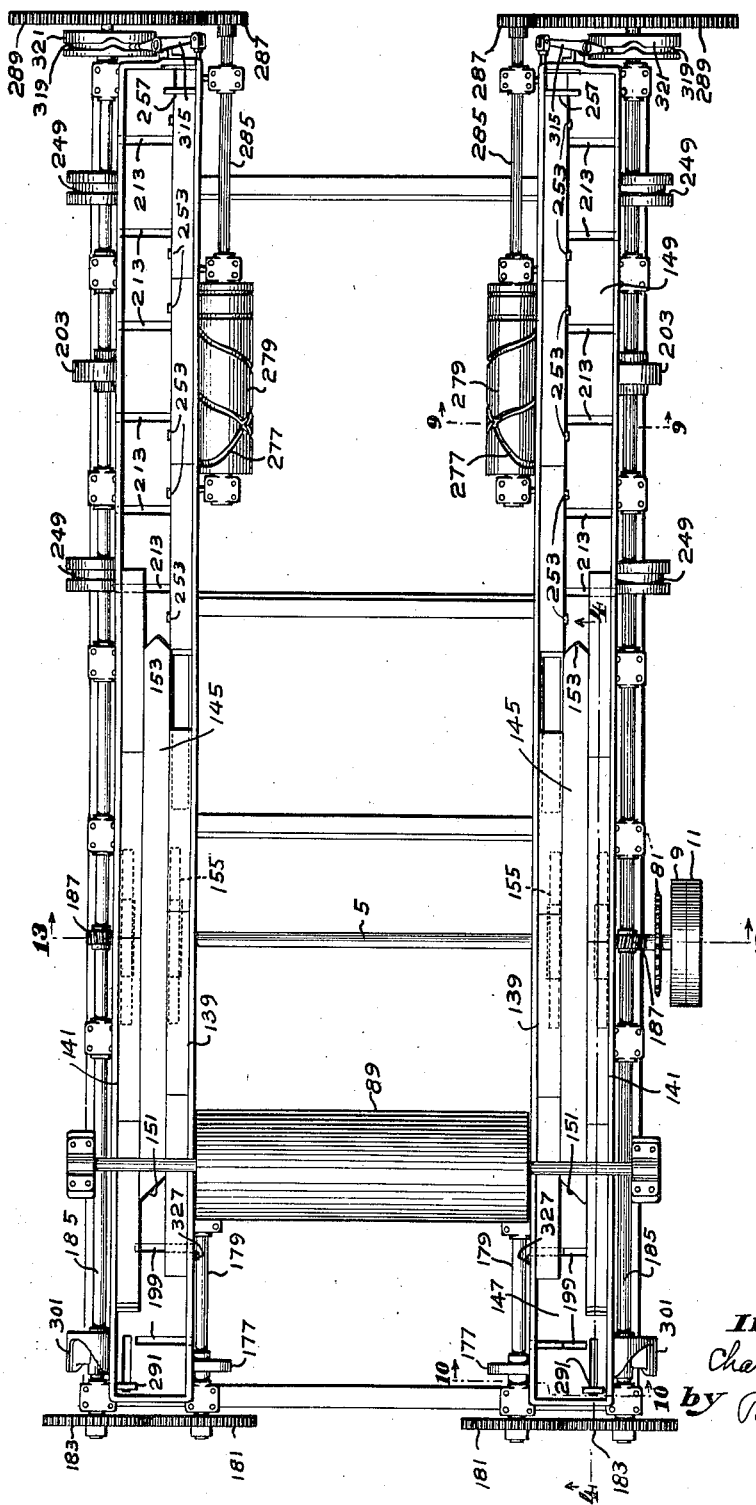
Fig. 2 is a plan of the lower portion of the machine.
Figure 5:
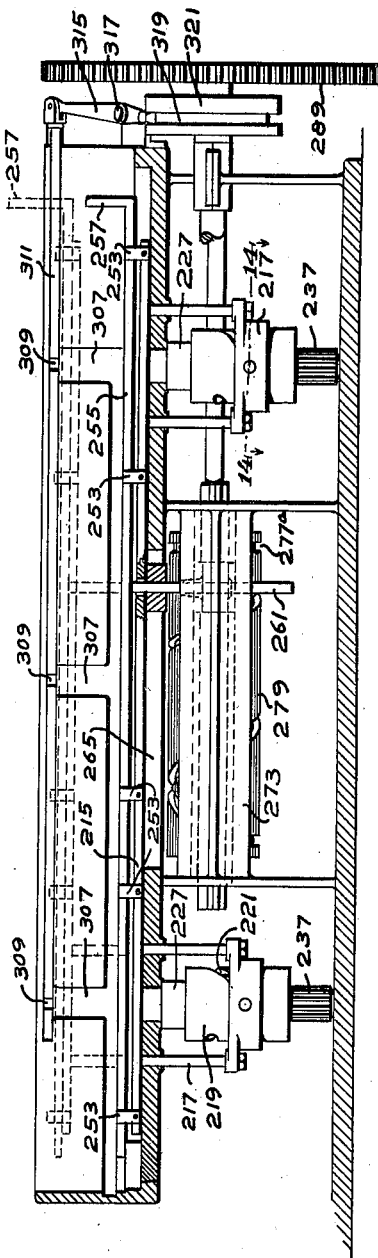
Fig. 5 is a view partly in elevation and partly in vertical section showing the carrier for the links or members of one of the trains, means for raising and lowering the carrier, and means for moving the carrier to cause the links or members to overtake and couple with the rear end of the train.
Figure 10:
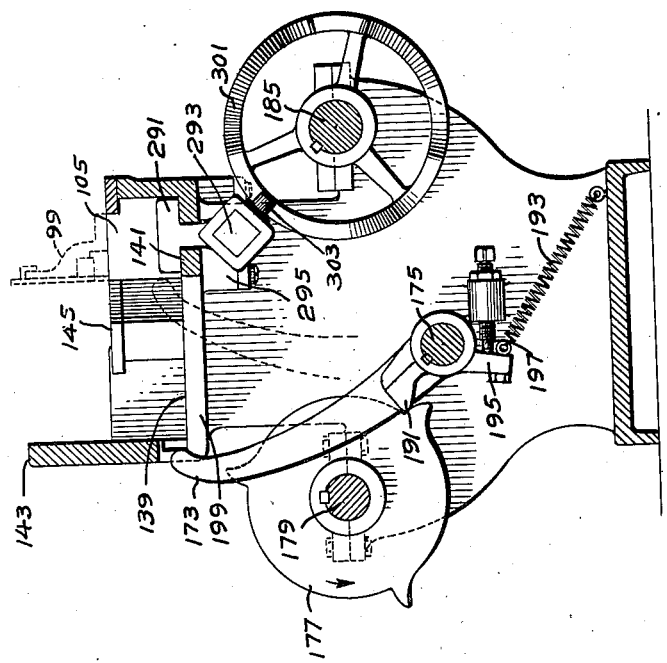
Figure 9:
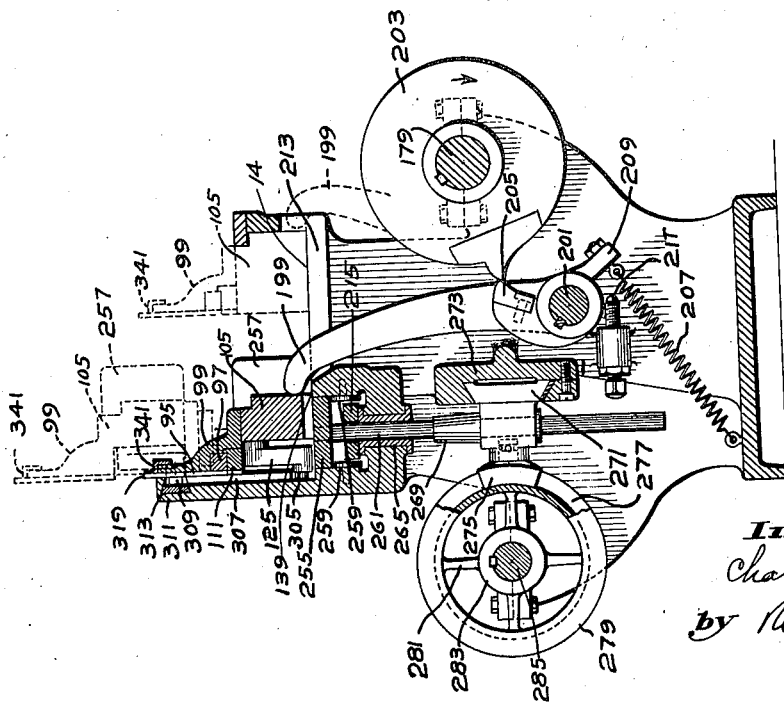
Figure 11:
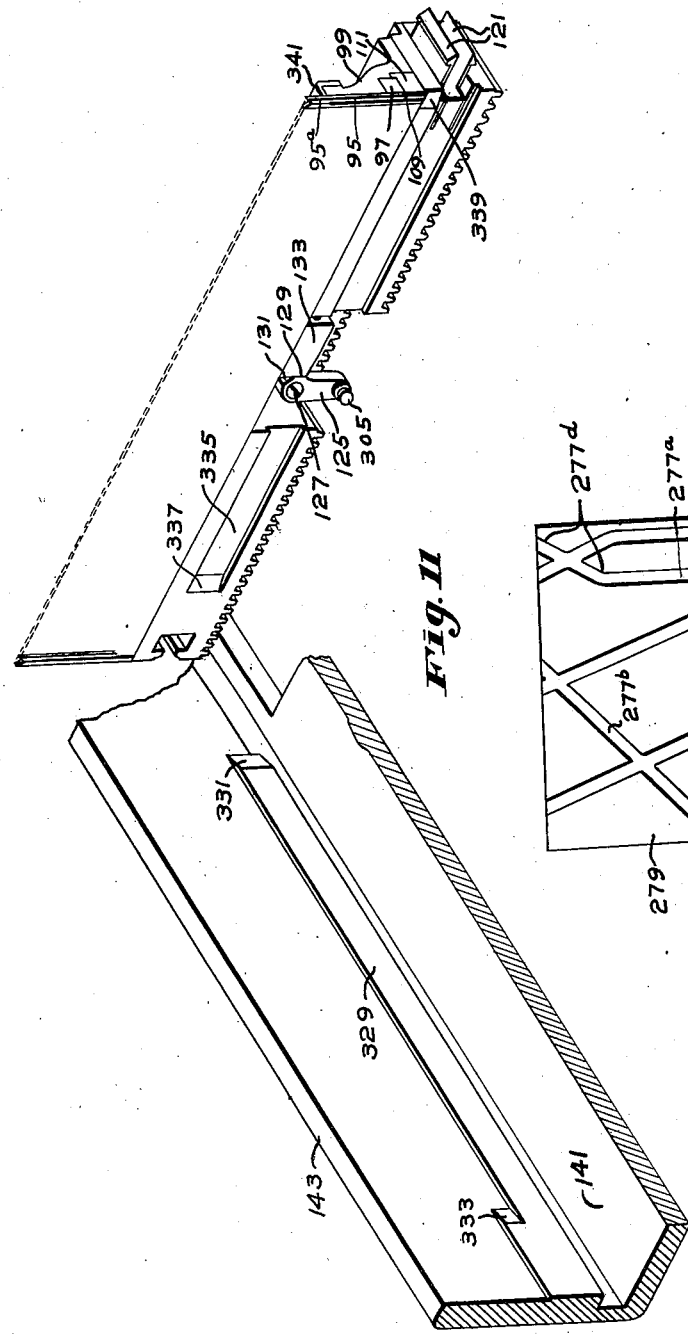
Figure 12:
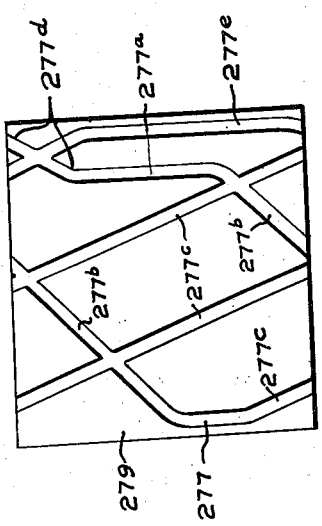
Figure 13:
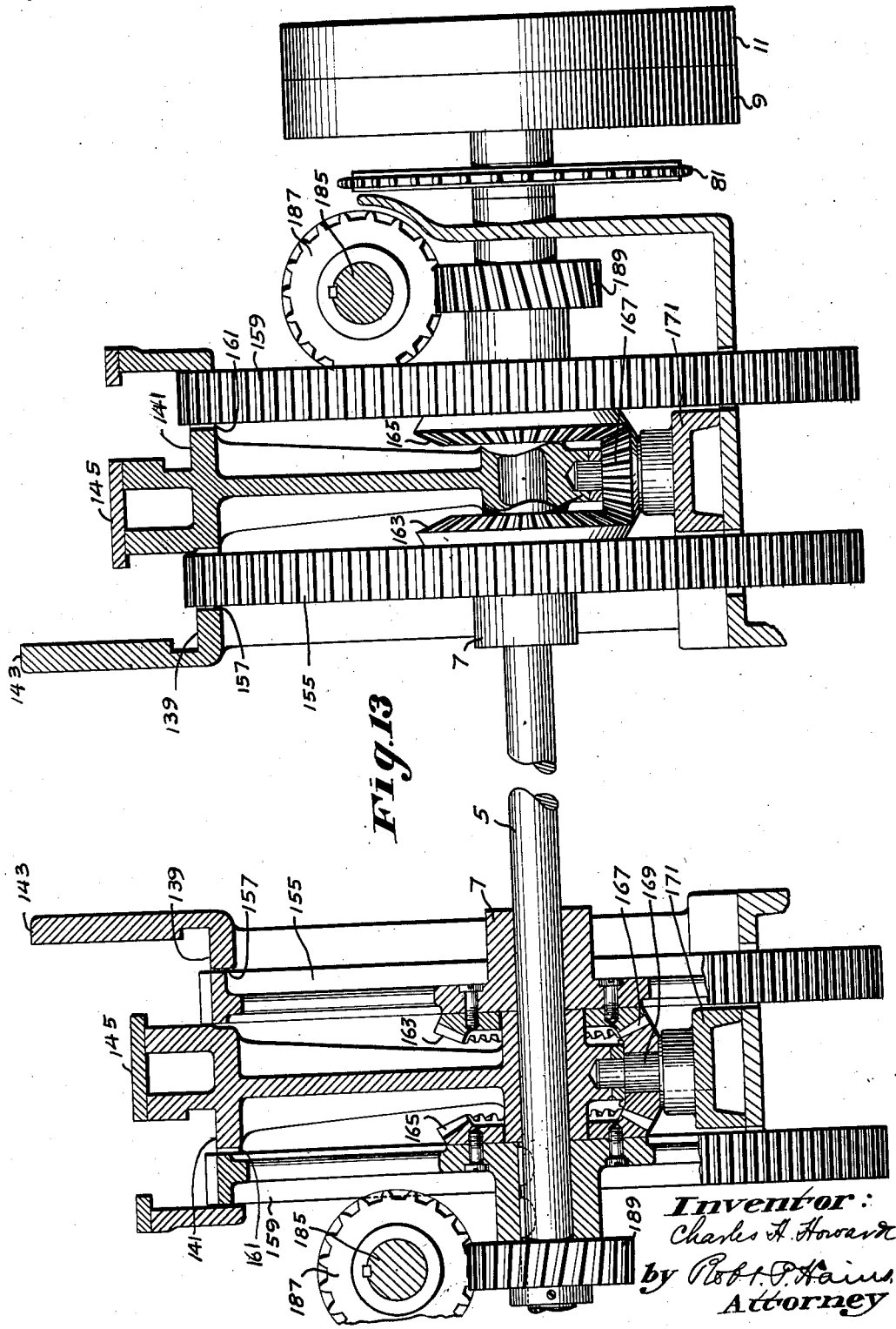

Fig. 6 on an enlarged scale is a side elevation of one of the links or members of the train, and devices employed for closing and opening the fingers of the link or member to cause said fingers to take and release the filaments;

Fig. 7 is a transverse sectional view showing the outward and return tracks for one of the trains, and the links or members guided by and traveling on said tracks;

Fig. 8 is a perspective view of portions of the relatively movable fingers of a link or member for taking and releasing the filaments;

Fig. 9 on an enlarged scale is a vertical section taken on line 9—9 of Fig. 2;

Fig. 10 on an enlarged scale is a vertical section taken on line 10—10 of Fig. 2;

Fig. 11 is a perspective view of one of the track links or members and a portion of the track therefor, disclosing the means for laterally moving the link or member to stretch the filaments;

Fig. 12 is a development of one of the cams having screw or spiral means for controlling the movements longitudinally of the machine of the carrier means for the links or members;

Fig. 13 on an enlarged scale is a vertical transverse section taken on line 13—13 of Fig. 2 showing the main driving shaft and the means for feeding the links or members along their outward and return tracks;

Fig. 14 is a horizontal section taken on line 14—14 of Fig. 5 through the yoke and the cams for elevating the link carrier;

Fig. 15 is a side elevation of the cam of one of the devices for elevating the link carrier means;

Fig. 16 is a view partly in side elevation and partly in section of the outer cam of the elevating device and the means for oscillating said cam;

Fig. 17 is a sectional detail of a part of the yoke carrying followers which work in the path of the outer cam;

Fig. 18 is a horizontal section taken on line 18—18 of Fig. 16;

Fig. 19 is a sectional detail to be referred to;

Fig. 20 is a plan of the hammer cutter means for severing the filaments from their source of supply;

Fig. 21 is a vertical transverse section taken on line 21—21 of Fig. 20;

Fig. 22 is a front elevation of the mechanism shown in Figs. 20 and 21, and

Fig. 22ª on an enlarged scale is a transverse section through one of the cutters and its anvil.

Figure 1:
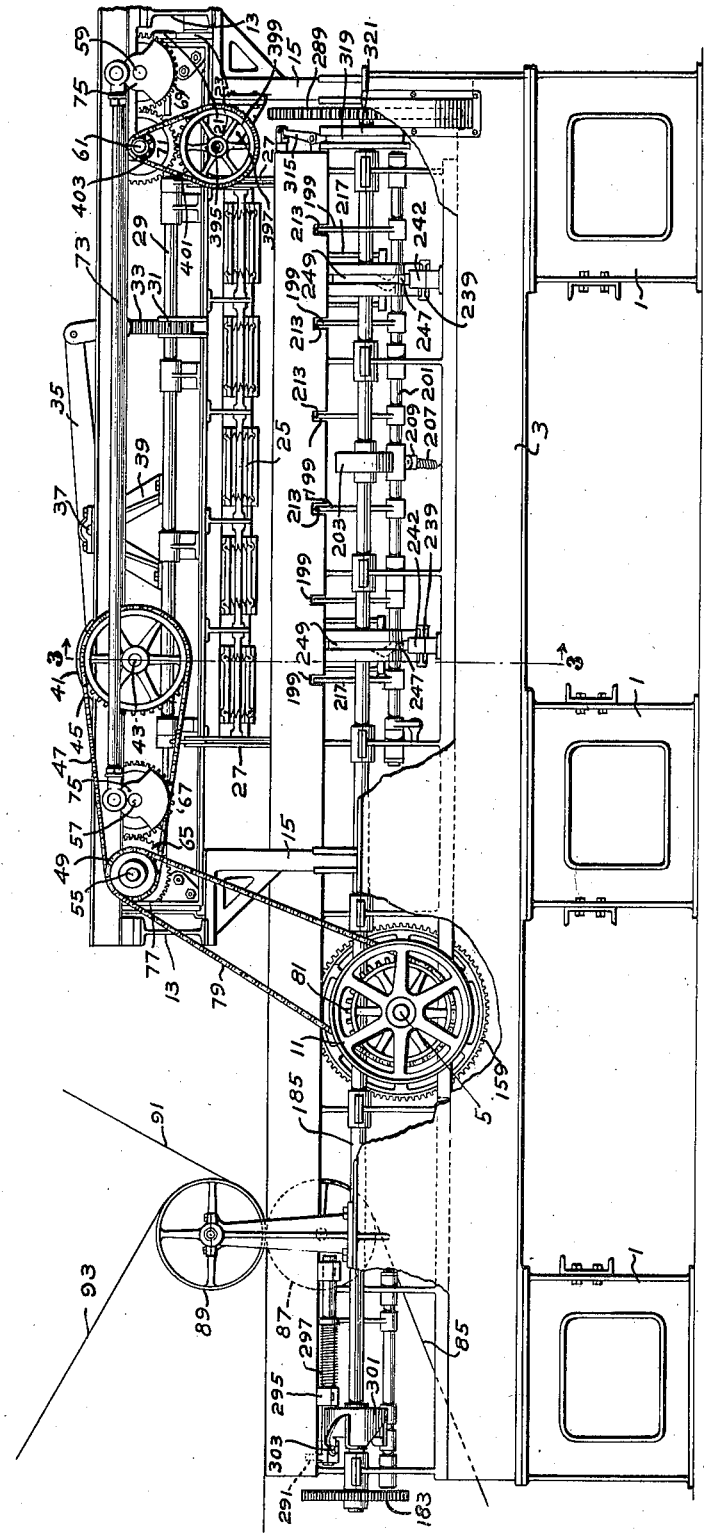
Figure 1 is a side elevation of a machine embodying the invention.

Referring to the drawings, the machine frame may be of any suitable character for supporting the operating parts, and may comprise base blocks 1 (Fig. 1) surmounted by the frame 3. The main driving shaft 5 (Figs. 1, 2 and 13) is journaled in suitable bearings 7 mounted on the frame 3, said shaft being provided with fast and loose pulleys 9 and 11 which may receive a belt and cause the operating parts of the machine to be actuated or rest as required.

Figure 3:
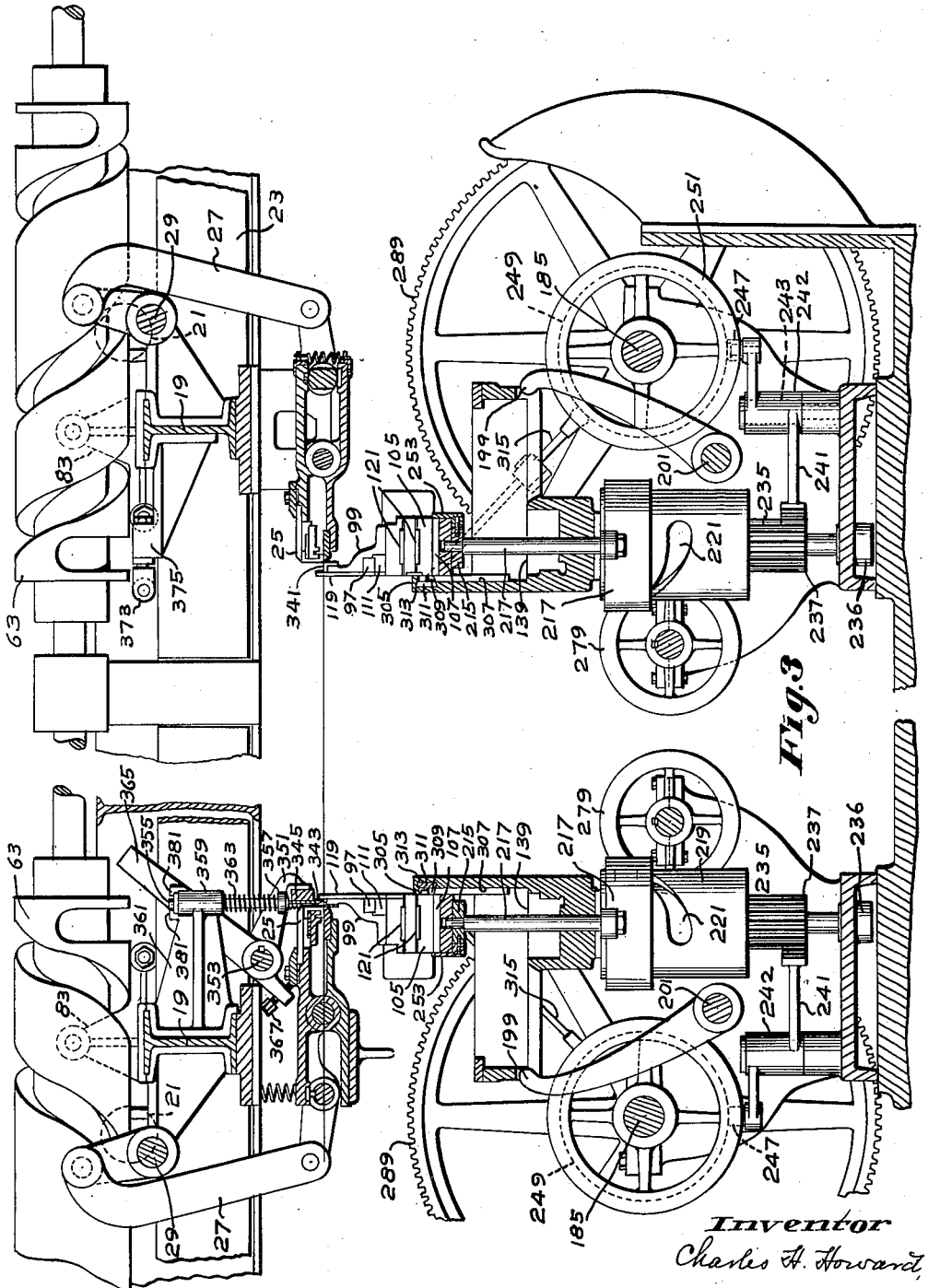
Fig. 3 is a vertical section taken on line 3—3 of Fig. 1.

The drawing or distending means may be similar to the drawing or distending means disclosed in my said copending application, Serial No. 214,910, and my application Serial No. 157,009, filed March 23, 1917. This means is supported on an outer framework 13 generally rectangular in plan, and mounted on corner posts 15 rising from and fixed to the main frame 3. Mounted upon the framework 13 for movement transversely of the machine is the gripper carrier frame 19 (Fig. 3) having rollers 21 which travel on the transverse trackways 23, the construction being such that the gripper carrier frame may move transversely of the gripper frame substantially as fully described in said prior application, and to enable the drawing or distending means to draw or distend the filaments from a source of supply into transverse relation to the machine or the receiver. The gripper carrier frame, as in said application, may have mounted thereon a series of drawing or distending means, such as grippers 25 having jaws for grasping and releasing the reinforcing filaments. In the present instance, the gripper carrier frame is provided with five sets of such grippers, but it will be understood that the number of grippers may be varied to suit conditions of use. The jaws of the grippers may be of appropriate character to seize and release reinforcing filaments, and may be constructed with relatively movable portions so that a plurality of reinforcing filaments of different sizes may be grasped by and between the jaws, the construction and operation being substantially the same as that shown in Letters Patent, No. 1,211,852, granted to me January 9, 1917.

The jaws may be appropriately operated by arms 27 actuated from the rock shaft 29, the pinion 31 (Fig. 1) and rack 33, the latter being operated by a lever 35 fulcrumed intermediate its ends on a shaft 37 mounted in bearings on brackets 39 mounted on the upper frame 13. The lever 35 may be rocked as required by a cam 41 operatively connected to one end of said lever and splined to a shaft 43 journaled in bearings on the upper frame. The shaft 43 may be driven by a sprocket wheel 45 (Fig. 1) fast on one end thereof, and connected by a sprocket chain 47 with a sprocket wheel 49 fast on a shaft 55 to be referred to journaled in suitable bearings in the frame 13.

The drawing-in or distending of the filaments transversely of the machine may be effected by two sets of grippers such as described, one disposed at each side of the machine, and each of which is moved toward the median longitudinal line of the machine and then back again to the side thereof substantially as described in said prior application.

Suitable means may be provided for imparting the transverse movements to the distending means, in the present instance, in the form of companion screw or spiral shafts 55 and 57 (Fig. 1) mounted in the gripper frame 13 adjacent one end thereof, and the companion shafts 59 and 61 adjacent the opposite end of said frame. The several shafts 55, 57, 59 and 61 may be each provided with screw or spiral means such as 63, substantially the same as disclosed in my said prior application. The construction is such that upon rotation of the screw or spiral means, the drawing or distending means at the opposite sides of the machine will be moved toward and from each other to draw or distend the reinforcing filaments into transverse relation with the machine.

The shafts 55 and 57 may have intermeshing gears 65 and 67 fast thereon, the shafts 59 and 61 may have intermeshing gears 69 and 71 fast thereon, and the shafts 57 and 59 may be connected by connecting rods such as 73 pivotally joined to counter-balanced cranks 75 fast on the shafts 57 and 59.

To drive the shafts of the screw or spiral means, a sprocket wheel 77 (Fig. 1) may be mounted fast on one end of the shaft 55, and may be connected by a sprocket chain 79 with a sprocket wheel 81 fast on the main driving shaft 5.

The screw or spiral means may be connected with the gripper carrier frame 19 by a shoe or slide 83 (Fig. 3) mounted to slide on the upper flange of the I-beam 17, and having connections for operative engagement with the screw or spiral means, said connections being shifted at the times required to effect reversal of the gripper carrier at the times required. Since the connections between the slide or shoe and the screw or spiral means and the means for shifting the same are fully shown and described in my prior copending application, Serial Nos. 157,009 and 214,910, referred to, detailed description thereof in the present application is unnecessary. As stated, the present invention contemplates that after the filaments have been distended transversely of the machine by the distending means, they shall be transferred to the paper to be reinforced, or other receiver. In the present instance, a web of paper 85 is led from a suitable source of supply between calender rolls 87 and 89 on shafts suitably supported on the machine frame. The web of paper may have a suitable adhesive applied thereto before reaching said rolls, or the web of paper may be previously gummed and dried, in which event the gummed surface would be moistened before reaching the calender rolls 87 and 89. It is also within the purport of the invention that longitudinal filaments 91 may be placed upon the paper web, so that when completed, the web shall have received both longitudinal and transverse strengthening filaments. The invention has also in view the superposing upon the paper web 85 another web 93 of paper or other material which may be led from a suitable source of supply to and between the rolls 87 and 89.

The means for taking the distended filaments to the web or webs of paper fed between said rolls, in the present instance, comprises a plurality of links or members which may be coupled together to form trains. In the present form of the invention, each link or member comprises a series of spring fingers 95 or equivalent elements (Figs. 6 and 8) having their lower ends secured to a bar 97 seated in a recess in a body 99, and secured thereto by screws 101 (Fig. 7), said body in turn being mounted on and secured by screws 103 to a bar or member 105 having a rack 107 formed on the base thereof. Coöperating and alternating with the series of fingers 95 is a series of spring fingers 109 or equivalent elements having their lower ends secured to a bar 111 located beneath the bar 97 for the series of fingers 95. The bar 111 rests upon the top of the bar 105, and may be held against lateral movement with respect to the bar 97 by a flange 113 adapted to enter a groove 115 between the body 99 and the bar 97, but the construction is such that the bar 111 may slide longitudinally relatively to the bar 97 to cause the fingers to take or release the filaments, as more fully hereinafter described.

Preferably, the series of fingers 95 and 109 have shanks of resilient material and heads 95$^a$ and 109$^a$ having roughened or other suitable faces for receiving the filaments 117 (Fig. 6) between them. Beveled tops 119 of the heads facilitate entrance of the filaments into said notches.

Each link or member may be provided with coupling means for detachably connecting the links or members to form a train, said coupling means in the present instance, comprising a pair of resilient hooks 121 set in kerfs in an end of the bar 105 and secured thereto by screws 121$^a$. A locking recess 123 is at the opposite end of the bar 105 and has shoulders for engagement with the spring hooks 121. The construction is such that when one link is moved toward the other, coupling hooks 121 of one will snap into the locking recess 123 of the other link, and thereby automatically connect the same.

The locking recess 123 is open at the sides so that the coupling hooks 121 may escape therefrom when one link is shifted laterally relatively to the other, as more fully hereinafter described.

Suitable means may be provided for automatically shifting the finger bar 111 longitudinally of the finger bar 97 to take and release the filaments at the times required. To accomplish this, in the present instance, an actuating device is provided conveniently in the form of an arm 125 (Figs. 6, 7 and 11) located in a recess in a face of the link, and adapted to rock on a screw 127 secured to the bar 105 of the link. This arm may have facets 129 and 131 adapted to engage an end of a block 133 located in said recess and secured to the bottom of the finger bar 111 by screws 135. This block is urged toward one or the other of the facets 129 and 131 by a coil spring 137 having its ends seated in recesses in the block 133 and in the bar 105 at one end of the recess.

The construction is such that when the actuating arm 125 is rocked by means to be described from its dotted to its full line position shown in Fig. 6, the facet 129 having a longer radius than the facet 131 will engage the block 133 and shift the finger bar 111 to close the fingers to take and hold the filaments. When, however, the actuating arm 125 is rocked by means to be described from its full to its dotted line position, the shorter radius facet 131 will be opposite the block 133, and the spring 137 will shift the block and finger bar 111 to open the fingers to release the filaments. The actuating arm will normally be held in its two positions of adjustment by the pressure of the spring actuated block on the facets.

Suitable means may be provided to guide the links or members in their circuit of movement in transferring the filaments from the drawing or distending means to the paper web or receiver. In the present form of the invention, this means comprises an outgoing track 139 (Figs. 2 and 7), and an ingoing or return track 141 mounted on the lower frame of the machine at opposite sides thereof. These tracks may conveniently be in the form of grooves or channels, so that the links may not only be supported, but may be guided laterally. The inner walls 143 of the outward tracks may project upward nearly to the tops of the fingers for gripping the filaments to prevent lateral flexion of said fingers while holding the distended filaments under tension.

The outward and return tracks may be separated by a wall 145 (Fig. 2) extending merely a portion of the length of the tracks, leaving a transfer space 147 at the outward end of the tracks, and a transfer space 149 at the inward end of the tracks. The intermediate wall 145 may have a tapered end 151 and a tapered end 153 to facilitate the transfer of the links to and from the outward and inward tracks, as more fully hereinafter described.

Suitable means may be provided to drive the links or trains of links along their tracks. To this end driving gears 155 (Figs. 1, 4 and 13) may be loosely mounted on the main shaft 5, referred to, and project upward through elongated openings 157 in the bottoms of the outward tracks to engage the racks of the links in their outward transit, and driving gears 159 may be mounted fast on the main driving shaft 5 and project upward through elongated openings 161 in the bottoms of the return tracks to engage the racks of the links in their return transit.

The driving gears for the outward tracks and the driving gears for the return tracks should be rotated in opposite directions. To accomplish this, miter gears 163 (Fig. 13) and 165 are secured to the driving gears 159 and 155 respectively, and mesh with an intermediate bevel gear 167 loose on a stub shaft 169 mounted on a support 171 on the lower frame. The construction is such that the driving gears may be driven continuously in opposite directions to cause the links or trains of links to travel along the outward and return tracks as required.

As stated, an important feature of the invention is the provision of means for transferring the leading links of the train progressively from the front to the rear end of the train after the links have delivered the filaments to the paper web or receiver. In the present instance, the leading links are transferred one by one from the outward to the return track, and are transferred in groups from the return to the outward track. In the present instance, a group consists of three links coupled together and having an overall length substantially equal to the overall length of the grippers of the drawing or distending means. It will be apparent that the overall lengths of a group of links and the grippers may be varied as desired.

Suitable means may be provided to shift the leading links progressively from the outward track through the transfer space 147, referred to, to the return track. To accomplish this, in the present instance, a pair of rocker arms 173 (Figs. 2 and 10) may be mounted on a rock shaft 175 mounted in suitable bearings in the lower frame of the machine. Coöperating with these arms is a cam 177 fast on a countershaft 179 journaled in bearings mounted on the lower frame, said shaft being driven by a gear 181 (Fig. 2) fast thereon meshing with a gear 183 fast on a shaft 185 journaled in bearings on the machine frame and driven by a spiral gear 187 fast on the shaft 185 meshing with a spiral gear 189 (Fig. 13) fast on the main shaft 5, referred to. The cam 177 is adapted to engage a short follower arm 191 (Fig. 10) fast on the rock shaft 175, said follower being pressed toward said cam by a coil spring 193 having one end anchored to the lower frame, and the opposite end anchored to an arm 195 on the rock shaft 175, the movement of the follower toward the cam under the action of said spring being limited by an adjustable stop 197.

The construction is such that the cam 177 will rock the arms 173 from their full to their dotted line positions shown in Fig. 10, and thereby shift the leading link from the outward to the return track. After transferring a link, the rocker arms will be snapped quickly back from their dotted to their full line positions shown in Fig. 10 to be in readiness to transfer the next link at the leading end of the train. The tracks may have suitable slots 199 therein to allow the rock arms to project up through bottoms of the tracks and engage the links.

The means for transferring the groups of links from the return track to the outward track, in the present instance of the invention, comprises three pairs of rock arms 199 (Figs. 2 and 9) fast on a rock shaft 201 mounted in suitable bearings on the lower frame. Coöperating with these arms is a cam 203 fast on the shaft 179, referred to, and adapted to engage a follower arm 205 fast on the rock shaft 201. The follower is urged toward said cam by a coil spring 207 having one end anchored to the lower frame, and its opposite end connected to a short arm 209 fast on the rock shaft, the movement of the follower toward the cam being limited by an adjustable stop 211.

The construction is such that rotation of the cam will rock the three pairs of arms 199 from their dotted to their full line position shown in Fig. 9, and thereby will shift the group of links from the return track through the transfer space 149, referred to, to the outward track. The arms 199 may project through slots 213 in the bottoms of the tracks and engage the links. It will be noted that the cam 177, referred to, has three projections thereon, whereas, the cam 203 has only one projection thereon, and that said cams are rotated at the same speed. As a consequence, the cam 177 will transfer three links successively from the outward to the return track in the same time that the cam 203 transfers a group of three links from the return track to the outward track. Since, as stated, the coupling hooks 121 may escape from the locking recesses 123 of the links when a link is shifted laterally with respect to the other, the leading links will be automatically uncoupled from the train in the course of their transfer from the outward to the return tracks.

The present invention contemplates that after the group of links has been transferred from the return to the outward track, the group of links shall be elevated to bring their fingers up to the plane of the filaments distended by the drawing or distending means, in order that said fingers may take the distended filaments therefrom. To accomplish this, in the present instance, an elevator is provided, conveniently in the form of a carrier bar 215 (Figs. 3, 5 and 9) in the inward end portions of the outward tracks, said bar, being connected to a pair of yokes 217 projecting through the bottom of the track, and automatically moved up and down at the times required by cam means. This cam means, in the present form of the invention, is constructed to afford a quick up and down movement of the elevator bar 215, and comprises an outer cam 219 (Fig. 16) having a pair of sharply pitched camways 221 receiving follower rollers 223 (Fig. 17) on studs 225 carried by the yoke 217. Within the outer cam 219 is an inner cam 227 having camways 229 therein receiving follower rollers 231 (Fig. 19) on studs 233 secured to the outer cam. The inner cam has a post 235 projecting downward through a pinion 237 formed on a boss depending from the outer cam, said post being secured in a boss 235 (Fig. 3) on the lower frame of the machine. Coöperating with the pinion 237 is an arcuate rack 239 (Figs. 16 and 18) on one end of a rock arm 241 having a hub 242 loose on a post 243 (Figs. 3, 16 and 18) mounted on the lower frame of the machine. An arm 245 fast on the hub 242 carries a roller 247 working in a circumferential cam groove 249 (Fig. 1) in a disk 251 fast on the shaft 185, referred to.

The construction is such that the rock arm 241 is oscillated at the times required to rock the outer cam. Since the yoke 217 is confined against oscillatory movement, the turning of the outer cam will cause the yoke follower rollers to ride quickly to the upper ends of the camways 221, and the turning of the outer cam will cause its follower rollers 231 to ride to the high points of the camways 229 in the fixed inner cam 227, thereby lifting the outer cam simultaneously with the rotation thereof. As a consequence, the elevator bar 215 is quickly raised. Also, when the rock arm 241 moves in the opposite direction, it will reversely rotate the outer cam 219 and quickly lower the elevator bar 215.

It is desirable that means should be provided to prevent the group of links from shifting laterally outward after transfer to the elevator. To accomplish this, in the present instance, the elevator may be provided with three pairs of lugs 253 (Figs. 2 and 3) projecting upward from the outer edge of the elevator bar. When the elevator is in its lowest position, the upper ends of these lugs will be down out of the way of the group of links, but on the initial upward movement of the elevator bar, the lugs will be projected upward to engage the sides of the links and prevent outward lateral movement thereof.

As stated, an important feature of the invention relates to means for advancing the group of links to cause the same to overtake and couple to the rear end of the train of links, being continuously advanced along the outward track. To accomplish this, a carrier may be provided, conveniently in the form of a bar 255 (Figs. 3, 5 and 9) having a pusher flange 257 at the rear end thereof, as will be noted in Fig. 5. This carrier bar is located in the inward portion of the outward track above the elevator bar 215, and adapted to slide on rollers 259 on suitable pins secured to the sides of the track. To move the carrier bar forward and backward along said rollers, a pin 261 is connected to said bar, and projects downward through an elongated slot 263 (Fig. 5) in the elevator bar, and thence through a shoe 265 adapted to slide in an elongated guide opening 267 (Fig. 5) in the bottom of the track. Said pin projects thence downward loosely through a sleeve 269 carried by a dovetail cross head 271 adapted to slide in a guide 273 mounted on the lower frame. A follower 275 works in a screw or spiral camway 277 (Figs. 2, 5, 9 and 12) in a cylinder 279 having spokes 281 connected to a hub 283 fast on a countershaft 285 driven by a pinion 287 (Fig. 2) fast on said shaft, and meshing with a gear 289 fast on the shaft 185, referred to. The camway 277 shown developed in Fig. 12 has a portion 277$^a$ formed to cause the carrier bar to dwell while the spring fingers of the links are elevated to take the filaments from the drawing or distending means and lowered; has a portion 277$^b$ to cause the carrier bar to advance quickly to enable the group of links on the carrier bar to overtake and couple with the rear of the train of continuously moving links; and has a portion 277$^c$ to cause the carrier bar to retreat slowly after the group of links has been coupled to the train to its original position in readiness to receive the next group of links transferred from the return to the outward track.

The group of three links is moving rearward in the course of its transfer to the carrier bar, and therefore, it is necessary to advance said bar slightly to compensate for this rearward movement and cause the links to aline properly with the grippers. Therefore, the cam has a portion 277$^d$ to produce this compensating advance of the carrier bar. The dwell of the carrier bar during the transfer is produced by the cam portion 277$^e$.

The rotation of the cam cylinder is properly timed with respect to the transfer of the group of links by the ratio between the gear 289 and the pinion 287 for driving the cam cylinder.

Suitable means may be provided for automatically coupling the leading links from the train of links on the outward track to the train of links continuously driven along the return track. To accomplish this, in the present instance, a pusher slide 291 (Figs. 1, 2, 4 and 10) may be located at the outward end of the return track on one end of a reciprocatory rod 293 adapted to slide in bearings 295 depending from the track, said rod being squared to prevent rotation thereof in said bearings. This rod is urged toward the right of Fig. 4 by a coil spring 297 confined between one of the bearings 295 and a flange 299 fast on said rod. The slide is urged in the opposite direction by a face cam 301 fast on the shaft 185, referred to, and coöperating with a roller 303 on a pin secured to the slide.

Figure 4:
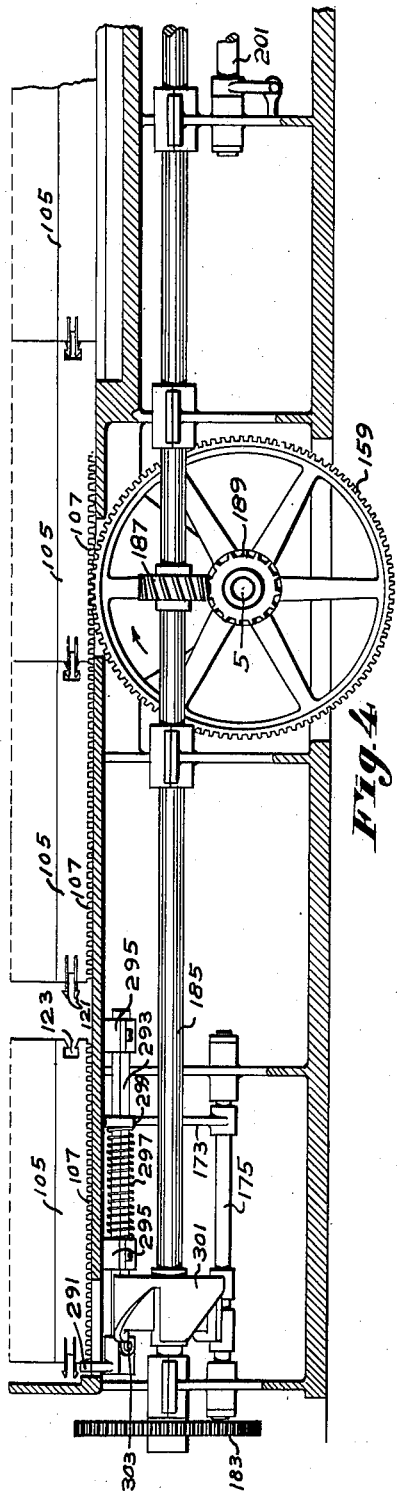
Fig. 4 is a vertical section taken on line 4—4 of Fig. 2.

The construction is such that in the course of the rotation of the cam 301, the spring 297 will shift the slide toward the right of Figs. 2 and 4, thereby causing said slide to engage the link which has been transferred from the outward track to the return track, and advance said link to couple the same with the rear end of the train continuously moved along the return track. After the link has been so coupled, the cam will quickly return the slide to its position shown in Figs. 2 and 4. The face cam is formed to present three projections, so that three links will be coupled to the returning train in the course of one rotation of said cam.

A device has been described for closing and opening the spring fingers to take and release the filaments at the times required. Suitable means may be provided to automatically rock the arm 125 of this device. To this end said arm is provided with a roller 305 adapted to slide upward in a recess 307 (Figs. 7 and 9) in the wall 143 of the outward track, and thence into a vertical groove 309 in a slide 311 adapted to reciprocate in a guide groove 313. Since each link is provided with an actuating arm, three grooves 309 are provided in the slide 311, as will be noted in Fig. 5. One end of the slide is connected to a lever 315 (Figs. 2 and 5) fulcrumed on a pin 317 mounted on the frame, and having a roller working in a cam groove 319, in a disk 321 fast on the shaft 185, referred to.

The construction is such that after the group of links has been elevated, and the rollers 305 of the actuating arms have entered the grooves 309, the cam disk 321 will shift the slide 311 and rock the actuating arm 125 from its dotted to its full line position shown in Fig. 6, and thereby close the spring fingers and cause the same to grasp the filaments which have been distended by the drawing or distending means.

After the links of the outward traveling train have carried the filaments to the web of paper or receiver, it is desirable to open the spring fingers to release the filaments. To accomplish this, a fixed abutment 325 (Figs. 6 and 7) may be secured by a bolt 327 to the wall 143 of the outward track in the path of the roller 305 of the actuating arm.

The construction is such that as the links progressively pass said fixed abutment, the roller 305 of each will engage the same and rock the arm 125 from its full to its dotted line position shown in Fig. 6, thereby allowing the spring 137 to shift the block 133 and the spring finger bar 111 to the left of Fig. 6, and open the spring fingers to release the filaments.

It is desirable to stretch or tension the filaments somewhat after they have been taken from the drawing or distending means by the spring fingers on the links, and before the filaments are applied to the paper web or receiver to insure that they shall be so applied in straight condition. To accomplish this, the wall 143 of the outward track may have a rib or projection 329 (Fig. 11) extending longitudinally thereof and provided with an incline 331 at one end thereof, and an incline 333 at a predetermined distance from the incline 331 and offset somewhat therefrom. Mating with the projection 329 is an elongated groove 335 formed in the bar 105 of the link. An incline 337 at one end of said groove coöperates with the incline 331, and the inner edge 339 of the bar 105 coöperates with the incline 333.

The construction is such that as the link moves along the track, the inclines 331 and 333 will simultaneously engage the incline 337 and the edge 339 respectively, and thereby shift the link laterally outward somewhat and stretch or tension the filaments. The projection 329 is of a length such that the links will remain offset during the portion of their transit leading to the paper web or receiver, and thus the filaments will be maintained in tensioned condition until the filaments have been applied to the web or receiver.

Suitable means may be provided for severing the filaments from their source of supply after they have been taken from the grippers by the spring fingers of the links. This means which may be similar in certain respects to that shown, described and claimed in my said application, Serial No. 139,475, comprises an anvil 341 (Figs. 3, 7 and 8) secured to the top of the body 99 of each link at a point somewhat beneath the upper ends of the spring fingers of the link. Coöperating with this anvil is a cutter 343 (Figs. 3 and 21) which may be of a length corresponding to the length of the anvil of each link, a number of said cutters being provided corresponding to the number of links elevated to the grippers. Each cutter may have a cutting edge for engagement with the anvil, and the cutter may be secured to a carrier bar 345 by screws 347 (Figs. 21 and 22) entered through elongated slots 349 in the cutter, the construction being such that the cutter may be susceptible of more or less movement to seat itself on the anvil and sever all of the filaments thereon. The cutters may be normally held up from the path of the distended filaments by light coil springs 343$^a$ (Fig. 22$^a$) connected to pins 343$^b$ on the cutter and pins 343$^c$ on the bar 345, the upward movement of the cutters relatively to said bar being limited by the screws 347 entered through the elongated slots 349 in said cutters. The carrier bar 345 may be secured to arms 351 fast on a rock shaft 353 journaled in bearings on the gripper carrying frame 19, referred to, adjacent the side of the machine where the filaments are supplied.

Suitable hammer means may be provided for striking the cutters against the anvils to sever the filaments, in the present instance, comprising pins 355, one for each cutter, having heads 357 for engagement with the upper edges of the cutters, said pins being mounted in sleeves 359 carried by brackets 361 secured to the gripper carrier frame 19. The hammer pins may be urged downward by coil spring 363 confined between the hammer heads 357 and the lower ends of the sleeves 359.

Suitable means may be provided to rock the cutter bar arms 351 upward and push the hammer pins upward to energize their springs. For this purpose an arm 365 (Figs. 3 and 21) may be mounted fast on the rock shaft 353, and the downward rocking of the cutter carrier bar 345 may be limited by the engagement of the head of a screw 367, tapped in a spur 369 on the arm, with a part of the gripper carrier frame, as will be noted in Fig. 3. Coöperating with the arm 365 is a roller 373 on the free end of an arm 375 secured to the gripper carrier frame at the side of the machine opposite to the gripper carrier frame on which the cutters and hammers are mounted.

The construction is such that as the gripper carrier frames approach one another in their movement transversely of the machine, the roller 373 will engage the arm 365 and rock the cutters and hammers upward and energize the springs 363. It will be noted that the cutters are thus lifted shortly before the approaching grippers meet each other, in order that the cutters may not interfere with the taking of the filaments from the supply grippers by the taking grippers.

The hammers should be held in their elevated energized positions until the proper time to release the same to sever the filaments. To this end a locking bar 377 may be provided having key hole slots 379 (Fig. 20) through which the upper ends of the hammer pins project, said locking bar being guided by inturned flanges 381 at the tops of the sleeves 359 for the hammer pins. The hammer pins may have circumferential grooves 383 (Fig. 22) therein, and the lock bar may be shifted to cause the reduced portions of the key hole slots to receive the circumferential grooves 383 and hold the hammer pins in raised position. Then the lock bar may be shifted in the opposite direction to cause the enlarged portions of the key hole slots to receive the hammer pins and allow the latter to be snapped downward by their springs. To shift the lock bar to automatically lock the hammers in their upward positions, a coil spring 385 may be provided having one end anchored to one of the brackets 361, and its opposite end connected to a lug 387 on the lock bar.

After the hammer pins have been locked in their energized positions, the sets of grippers at the supply and taking sides of the machine will separate, thereby retracting the arm 375 from the arm 365 and allowing the cutter carrier bar to lower until limited by the engagement of the stop screw 367 with the gripper carrier frame. This will arrest the cutters at a point such that their light springs 343ª will hold them just above the distended filaments where they will be in readiness to receive the impact of the hammers to sever the filaments when the hammers are released by means which will now be described.

To release the hammers, a cam 389 may be mounted on the shaft 391 and be adapted to engage the lug 393 on the lock bar, the construction being such that in the course of the rotation of the cam, it will engage said lug and shift the bar in a direction to release the hammer pins and allow their springs to impel them downward and cause the cutters to strike their anvils and sever the filaments from their source of supply.

Suitable means may be provided to rotate the cam 389 and cause the same to release the hammer pins at the times required. To accomplish this, in the present instance, said cam is mounted fast on a shaft 395 (Fig. 1) journaled in bearings in brackets 397 projecting inward from and secured to the posts 15 at the right end of Fig. 1. The shaft 395 has a sprocket wheel 399 fast thereon connected by a sprocket chain 401 with a sprocket wheel 403 fast on the shaft 61, referred to. The construction is such that when the gripper carrier frame carrying the cutting mechanism moves from its mid position toward the left of Fig. 3, the lug 393 beneath the lock bar 377 will be brought into the plane of the cam in position to be engaged by the projection on said cam and shifted to release the hammer pins as described.

The operation of the machine will be readily understood from the foregoing description thereof.

By the invention is provided a machine which will rapidly distend a plurality of filaments and transfer the distended filaments to the paper or other receiver. It will be noted that the filaments are positively held taut from the time they are distended until they are pressed into engagement with the paper by the rolls 87 and 89 at the delivery end of the machine. As a consequence, the filaments cannot slacken and become irregular, but on the contrary, will be maintained in straight condition so as to afford the maximum reinforcement to the paper and produce a perfect product.

It will be understood that the invention is not limited to the specific embodiment shown, but that various deviations may be made therefrom without departing from the spirit and scope of the appended claims.

What is claimed is:—

1. A machine of the character described, comprising in combination, means for feeding material to be reinforced by a series of transverse reinforcing filaments, means for distending a plurality of reinforcing filaments transversely of the material to be reinforced, means for transferring the filaments from said distending means to said material including a series of members movable in a predetermined path, and means for shifting said members progressively to and from said path.

2. A machine of the character described, comprising in combination, drawing or distending means for drawing reinforcing filaments from a source of supply and distending said filaments, means for transferring the distended filaments to material to be reinforced including a series of independent members adapted to travel in a circuit, and means for coupling said members to form a train of members in the course of their transit through said circuit, said members being provided with means for taking and holding the distended filaments.

3. A machine of the character described, comprising in combination, means for drawing or distending filaments transversely of material to be reinforced, and means for transferring the filaments from said drawing or distending means to said material including a series of members movable in outgoing and ingoing paths, and means for transferring said members progressively to and from said outgoing and ingoing paths.

4. A machine of the character described, comprising in combination, a supporting frame, means for distending a plurality of reinforcing filaments transversely of said frame, and opposed trains of detachably connected members for taking the filaments from said distending means and conveying the same longitudinally of said frame.

5. A machine of the character described, comprising in combination, opposed trains of members for taking a plurality of reinforcing filaments from a source of supply, a pair of tracks for each of said trains, and means for progressively transferring the leading and trailing members of said train from one of said tracks to the other.

6. A machine of the character described, comprising in combination, opposed trains of members for taking reinforcing filaments from a source of supply, out and in tracks for each train, means for transferring the members to and from said tracks adjacent the terminals thereof, and means on each of said members for holding the filaments distended between said trains.

7. A machine of the character described, comprising in combination, opposed trains or members for conveying distended filaments longitudinally of the machine, outward and return tracks for each of said trains, means for driving the train along said tracks, and means for transferring the members of the train to and from the outward and return tracks.

8. A machine of the character described, comprising in combination, means for distending a plurality of reinforcing filaments transversely of the machine, means for feeding material to be reinforced by said filaments, and means for transferring said filaments from said distending means to said material including a train of members having means for taking the reinforcing filaments from said distending means, outward and return tracks for said train, means for moving said members along said outward track, means for uncoupling said members progressively from said train and transferring said members from said outward to said return track, and means for transferring said members from said return track to said outward track and recoupling the same to said train.

9. A machine of the character described, comprising in combination, means for drawing or distending reinforcing filaments transversely of the machine, means for feeding material to be reinforced by said filaments, and means for transferring the filaments from said drawing or distending means to said material including outward and return tracks, members for taking the distended filaments and conveying the same progressively along said outward track, means for transferring the members from said outward to said return track, means for transferring said members from said return track to said outward track, means for uncoupling the members transferred from said outward to said return track, and means for coupling the members transferred from said return track to said outward track.

10. A machine of the character described, comprising in combination, means for distending reinforcing filaments transversely of the machine, means for feeding material to be reinforced, and means for transferring the filaments from said distending means to said material including a series of members or links, means for coupling said members or links together to form a train, and means for progressively taking the advancing members or links of said train and coupling the same to the rear end of said train.

11. A machine of the character described, comprising in combination, means for distending reinforcing filaments, means for feeding material to be reinforced by said filaments, and means for transferring the filaments from said distending means to said material including a series of members or links, means to couple said members or links together to form a train, and means to progressively transfer the leading members or links of said train to the trailing end of said train, each of said members or links having a series of fingers or equivalent elements thereon for taking the filaments from said distending means.

12. A machine of the character described, comprising in combination, means for feeding material to be reinforced by filaments, and means for taking a series of filaments from a source of supply and applying the same to the material including a series of members or links, means to couple said members or links together to form a train, means to drive said train in the direction of said material, means to progressively transfer the advancing members or links of said train to the rear end of said train, and means to impart a movement to said train of members in a direction transverse to its path of travel to stretch the filaments.

13. A machine of the character described, comprising in combination, means for distending a plurality of reinforcing filaments, and means to transfer the filaments from said distending means to material to be reinforced by said filaments including a series of links or members coupled together to form a train, each of said members or links having fingers or equivalent elements for taking the filaments from said distending means, means for progressively elevating and lowering said members or links to enable their fingers or elements to take the filaments from said distending means, means to advance said train of members to convey the filaments to said material, and means progressively to transfer the leading members or links of said train to the rear end thereof.

14. A machine of the character described, comprising in combination, means for feeding material to be reinforced, means for taking a plurality of filaments from a source of supply and distending the same transversely of said material, and means for transferring the filaments from the distending means to said material including a series of members coupled together to form a train, each of said members having fingers or equivalent elements for holding the filaments, means for advancing said train toward said material, means for progressively transferring the advancing members of the train to the rear end thereof, means to elevate said members to bring their fingers or elements in position to take the filaments from the distending means, and means for severing the distended filaments from their source of supply after said members have been elevated.

15. A machine of the character described, comprising in combination, opposed series of members forming trains for conveying distended filaments longitudinally of the machine, each of said members having means thereon for holding the filaments, and each of said members having a rack thereon, outward and return tracks for each of said trains, and gear means for engagement with said racks to advance said trains along said tracks.

16. A machine of the character described, comprising in combination, means for feeding material to be reinforced, and means for applying a plurality of reinforcing filaments to said material including members or links coupled together to form a train, each of said members having a rack thereon, and a plurality of fingers or equivalent elements for holding the filaments, and gear means for progressively engaging the racks of said members to advance the latter longitudinally of the machine toward the material to be reinforced.

17. A machine of the character described, comprising in combination, means for feeding material to be reinforced, means for distending reinforcing filaments transversely of the machine, means for transferring the filaments from said distending means to said material including a series of members or links, means for coupling said members together to form a train, means to advance said train longitudinally of the machine, means to transfer the leading members of said train in groups to the trailing end of said train, each of said groups being of a length sufficient to take the plurality of reinforcing filaments extended transversely of the machine by said distending means.

18. A machine of the character described, comprising in combination, means for feeding material to be reinforced, means for taking a plurality of reinforcing filaments from a source of supply and transferring the same to said material including members or links, means to couple said members or links together to form a train, outward and return tracks for said train, and cam actuated means for progressively transferring said members or links from one of said tracks to the other.

19. A machine of the character described, comprising in combination, means for feeding material to be reinforced, means for taking a plurality of reinforcing filaments from a source of supply and transferring the same to said material including members or links, means to couple said members or links together to form a train, outward and return tracks for said train, a reciprocable transfer element, and means to reciprocate said element to progressively transfer said members or links from one of said tracks to the other.

20. A machine of the character described, comprising in combination, means for distending a plurality of reinforcing filaments transversely of the machine, and means for taking the distended filaments and feeding the same longitudinally of the machine including a series of members having means for holding the distended filaments, each of said members having couplings at the ends thereof for automatically coupling said members together to form a train, and means for driving said train.

21. A machine of the character described, comprising in combination, means for distending a plurality of reinforcing filaments transversely of the machine, and means for taking the distended filaments and feeding the same longitudinally of the machine including a series of members having means for holding the distended filaments, each of said members having a locking recess at one end and a spring locking projection at the opposite end, that the members may be automatically coupled when one is fed toward the other, and means for driving said members.

22. A machine of the character described, comprising in combination, means for distending a plurality of reinforcing filaments transversely of the machine, and means for taking the distended filaments and feeding the same longitudinally of the machine including a series of members having means for holding the distended filaments, couplings for connecting said members, means for automatically progressively shifting the advancing members laterally with respect to others of said members, the couplings connecting adjacent members being constructed and arranged automatically to release the couplings to disconnect the laterally shifted members from the other members.

23. A machine of the character described, comprising in combination, means for feeding material to be reinforced, and means for taking a plurality of reinforcing filaments from a source of supply and applying the same to said material including a series of members having couplings to connect said members to form a train, outward and return tracks for said train, means progressively to transfer said members from one of said tracks to the other, and cam actuated means for progressively moving the transferred members toward advancing members to couple the same together.

24. A machine of the character described, comprising in combination, means for feeding material to be reinforced, means for taking a plurality of filaments from a source of supply and applying the same to said material including a series of members having means for holding the filaments, couplings for detachably connecting said members to form a train, and means progressively to transfer leading members of said train to the rear end thereof including a carrier for the members, and means to advance said carrier to couple the members to the rear of the train.

25. A machine of the character described, comprising in combination, means for feeding material to be reinforced, means for taking a plurality of filaments from a source of supply and applying the same to said material including a series of members having means for holding the filaments, couplings for detachably connecting said members to form a train, and means progressively to transfer leading members of said train to the rear end thereof including a carrier for the members, and screw or spiral means to advance said carrier.

26. A machine of the character described, comprising in combination, means for feeding material to be reinforced, means for taking a plurality of filaments from a source of supply and applying the same to said material including a series of members having means for holding the filaments, couplings for detachably connecting said members to form a train, means progressively to transfer leading members of said train to the rear end thereof including a carrier for the members, and a plurality of screws or spirals for reciprocating said carrier to progressively couple the members to the rear end of the train.

27. A machine of the character described, comprising in combination, means for feeding the material to be reinforced, and means for taking a plurality of filaments from a source of supply and transferring the same to said material including members having means thereon for holding the filaments, couplings detachably connecting said members to form a train, and means progressively to transfer the leading members of said train to the rear end thereof including a carrier, means to transfer the members onto said carrier, and means movable in a position to limit lateral movement of said members on said carrier.

28. A machine of the character described, comprising in combination, means for distending a plurality of reinforcing filaments transversely of the machine, and means for taking said filaments from said distending means and feeding the same longitudinally of the machine including a series of members or links having means thereon for holding the filaments, couplings for detachably connecting said members or links to form a train, means progressively to transfer the leading members or links of the train to the rear end thereof including a carrier, an elevator mounted on said carrier, and means to lift said elevator to bring said members into position to receive the filaments from said distending means.

29. A machine of the character described, comprising in combination, means for distending a plurality of reinforcing filaments transversely of the machine, and means for taking said filaments from said distending means and feeding the same longitudinally of the machine including a series of members or links having means thereon for holding the filaments, couplings for detachably connecting said members or links to form a train, means progressively to transfer the leading members or links of the train to the rear end thereof including a carrier, an elevator mounted on said carrier, means to lift said elevator to bring said members into position to receive the filaments from said distending means, and means for advancing said elevator on said carrier to couple the members to the train.

30. A machine of the character described, comprising in combination, means for feeding material to be reinforced, and means to apply a plurality of reinforcing filaments thereto including a series of members having means thereon for holding the filaments, couplings detachably to connect the members, and means for operating said holding means to take and release the filaments comprising an actuating element on the member, a fixed element for shifting said actuating member in the course of the travel of said train to cause said holding members to release the filaments, and cam actuating means for shifting said actuating member to cause said holding means to take the filaments.

31. A machine of the character described, comprising in combination, means for feeding material to be reinforced, and means for taking a plurality of reinforcing filaments from a source of supply and applying the same to said material including members, each having series of relatively movable fingers for holding the filaments, said members having couplings to connect the same to form a train, means to advance said train longitudinally of the machine, and means automatically to shift one series of fingers of each member relatively to the other to cause said fingers to take and release the filaments.

32. A machine of the character described, comprising in combination, means for feeding material to be reinforced, and means for applying reinforcing filaments to said material including members adapted to travel longitudinally of the machine and each having series of relatively movable fingers or equivalent elements for taking and releasing the filaments, a fixed abutment, a reciprocatory device, and an actuator on each member for engagement with said fixed abutment and for connection with said reciprocatory device for relatively moving said series of fingers or equivalent elements to take and release the filaments.

33. A machine of the character described, comprising in combination, means for feeding material to be reinforced, and means for applying reinforcing filaments to said material including a series of members movable longitudinally of the machine and each having series of fingers or equivalent elements for holding the filaments, relatively adjustable bars connected to said series of fingers or equivalent elements, an abutment, an operating device, and an actuator on each of said members coöperating with said abutment and operating device for shifting one of said bars relatively to the other to cause said fingers or equivalent elements to take and release the filaments.

34. A machine of the character described, comprising in combination, means for feeding material to be reinforced, and means to apply a plurality of reinforcing filaments to said material including members movable longitudinally of the machine each of said members having series of mating spring fingers thereon having opposed faces for holding the filaments, means for moving one of said series of fingers relatively to the other, and couplings for detachably connecting said members to form a train.

35. A machine of the character described, comprising in combination, grippers for distending filaments from a source of supply transversely of the machine, opposed series of members having means thereon for taking the filaments from said grippers, a cutter bar, hammer means, spring means for actuating said hammer means, means for energizing said spring means on relative movement of said grippers, means to lock said hammer means in energized position, and cam means for automatically releasing said locking means to render said spring means effective to impel the hammer means against said knife bar to sever the distended filaments from their source of supply.

36. A machine of the character described, comprising in combination, means for taking a plurality of reinforcing filaments from a source of supply and distending the same transversely of the machine, members having means for taking the filaments from said distending means, couplings for detachably connecting said members to form a train, means to advance the train longitudinally of the machine, means to elevate the members into position to take the distended filaments, cutter means, and hammer means for automatically causing said cutter means to sever and distended filaments from their source of supply.

37. A machine of the character described, comprising in combination, means for taking a plurality of reinforcing filaments from a source of supply and distending the same transversely of the machine, a series of members having means for taking and holding the distended filaments, each of said members having anvil means, a cutter, and hammer means for striking said cutter against said anvil means to sever the filaments from their source of supply.

38. A machine of the character described, comprising in combination, means for taking a plurality of reinforcing filaments from a source of supply and distending the same transversely of the machine, means for feeding material to be reinforced by said filaments longitudinally of the machine, means for taking the filaments from the distending means, means to cause said taking means intermittently to take groups of filaments from said distending means, and means for causing said taking means to continuously apply the filaments to said material.

39. A machine of the character described, comprising in combination, means for distending a plurality of reinforcing filaments transversely of the machine, means to feed material to be reinforced by said filaments longitudinally of the machine, a train of links or members having fingers or equivalent elements for holding the filaments distended transversely of the machine, means continuously to drive said train of links or members to continuously apply the filaments to said material, means intermittently to move the links or members toward the distending means into position to take the distended filaments therefrom, and means to cause such links or members to overtake and connect with the continuously moving train of links or members.

40. A machine of the character described, comprising in combination, means for distending filaments transversely of the machine, means for feeding material to be reinforced, a train of links or members having means for holding the distended filaments, means for continuously advancing said train of links or members, means for causing links or members to take filaments from said distending means, and means for causing such links or members to overtake and connect with the rear end of said train.

41. A machine of the character described, comprising in combination, means for distending filaments transversely of the machine, means for feeding material to be reinforced by said filaments, an outward train of links or members having means for holding the distended filaments, a return train of such links or members, means continuously to advance said trains, means to transfer links or members from the front of said return train into position to receive the distended filaments from the distending means, and means to cause said links or members after taking the filaments to overtake and connect with the rear of said advancing train of links or members.

42. A machine of the character described, comprising, in combination, means for distending filaments transversely of the machine, a pair of feed rolls for feeding material to be reinforced by said filaments, a train of links or elements having means for holding the distended filaments, means continuously to drive said train to apply the filaments to said material as the latter passes between said rolls, means to cause such links or members to take the distended filaments from said distending means, and means to cause the links or members after taking the distended filaments to overtake and connect with the rear end of said continuously moving train.

43. A machine of the character described, comprising, in combination, means for distending a plurality of filaments from a source of supply transversely of the machine, and means for severing the filaments from their source of supply including a carrier, a cutter mounted on said carrier, spring means tending to move said cutter upward relatively to said carrier, hammer means, spring means tending to force the hammer means against said cutter to sever the filaments, means to move said cutter carrier upward to energize said spring means, and means to limit downward movement of said carrier after energization of said spring means.

44. A machine of the character described, comprising, in combination, means for distending a plurality of reinforcing filaments from a source of supply transversely of the machine, and means for severing the filaments from their source of supply including a cutter, hammer means for actuating said cutter, and spring means for normally holding said cutter somewhat above the plane of the distended filaments.

45. A machine of the character described, comprising, in combination, two sets of grippers movable transversely of the machine for distending a plurality of reinforcing filaments from a source of supply, and means for severing the filaments from their source of supply including a cutter, hammer means, spring means for causing said hammer means to sever the filaments, means for energizing said spring means as said sets of grippers approach in their movement transversely of the machine, and means to prevent the cutter from dropping beneath the plane of the distended filaments excepting when impelled by said hammer means.

46. A machine of the character described, comprising, in combination, means for distending a plurality of reinforcing filaments transversely of the machine, means to sever the filaments to provide groups of transverse filaments, a pair of feed rolls for feeding material to be reinforced longitudinally of the machine, and means for transferring the groups of distended filaments from said distending means to the bight between said rolls while maintaining positive control over the filaments throughout the transfer operation.

In testimony whereof, I have signed my name to this specification.

CHARLES H. HOWARD.